United States Patent [19]

Grenness

[11] 4,064,325
[45] Dec. 20, 1977

[54] ELECTRIC STORAGE BATTERIES

[75] Inventor: Morten Grenness, Ramsbottom, England

[73] Assignee: Chloride Group Limited, London, England

[21] Appl. No.: 656,982

[22] Filed: Feb. 10, 1976

[30] Foreign Application Priority Data

Feb. 14, 1975 United Kingdom ................ 6387/75

[51] Int. Cl.² ........................................... H01M 4/36
[52] U.S. Cl. .................................... 429/104; 429/218; 429/221
[58] Field of Search ................... 136/6 FS, 6 LF, 6 S, 136/6 SA, 20, 25; 429/101–104, 218, 221

[56] References Cited

U.S. PATENT DOCUMENTS

| 3,877,984 | 4/1975 | Werth | 136/6 LF X |
| 3,969,138 | 7/1976 | Werth et al. | 136/6 FS |
| 3,969,139 | 7/1976 | Lai | 136/6 LF X |

Primary Examiner—Charles F. LeFevour
Attorney, Agent, or Firm—Oblon, Fisher, Spivak, McClelland & Maier

[57] ABSTRACT

An electric accumulator having an alkali metal as the reactant at the negative electrode, and a cationically conductive separator physically separating the reactant at the negative electrode from a reactant at the positive electrode, while permitting passage of cations of the alkali metal therethrough, characterized in that the reactant at the positive electrode comprising a mixture which, in the fully charged state, comprises 5 to 75 mole % of aluminium chloride and 95 to 25 mole % iron III chloride.

4 Claims, 4 Drawing Figures

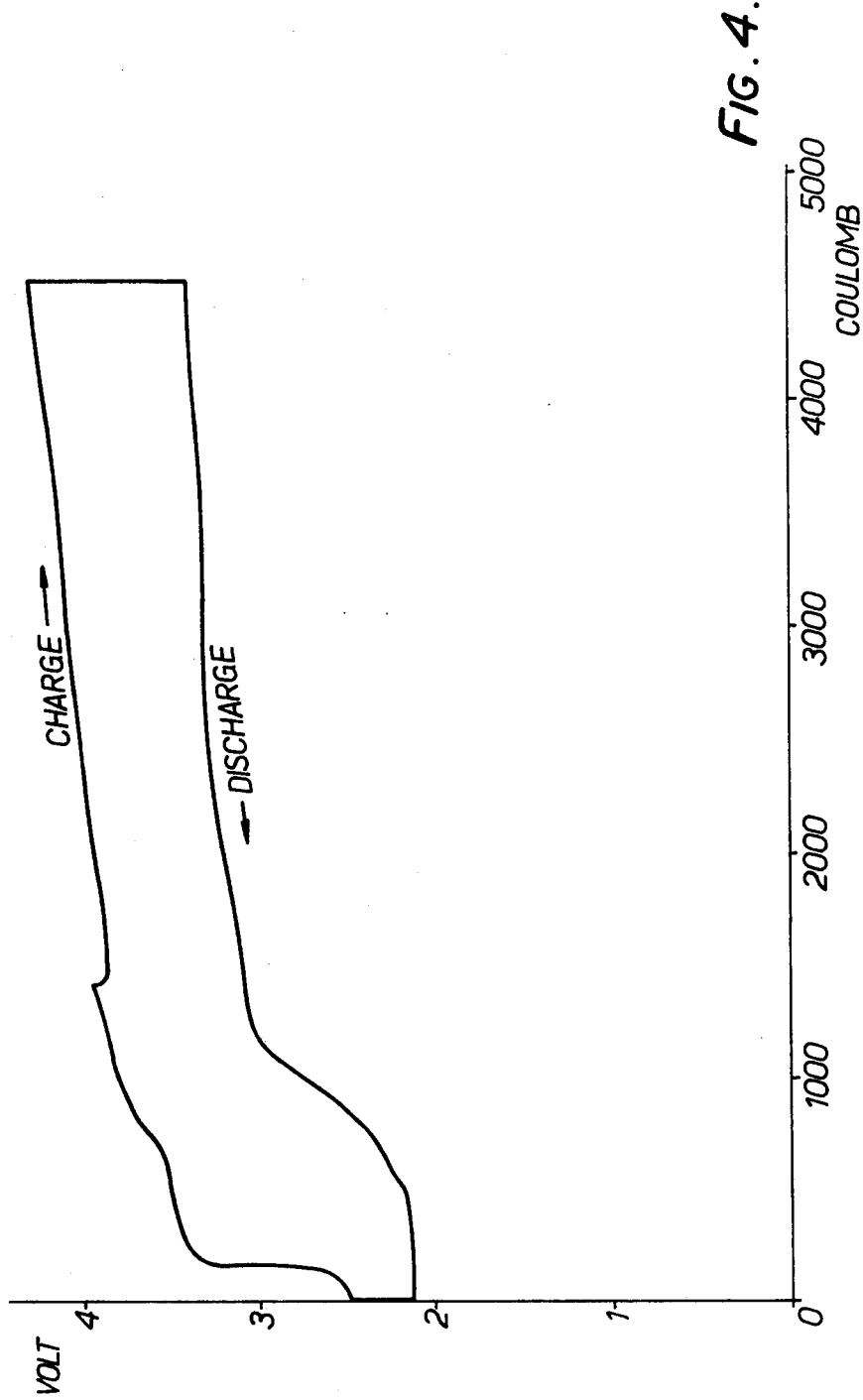

ELECTRIC STORAGE BATTERIES

The present invention relates to electric accumulators which utilize a fused metal, e.g. molten alkali metal, as the reactant at the negative electrode and a cationically conductive separator physically separating the reactant at the negative electrode from a reactant at the positive electrode whilst permitting passage of cations therethrough.

The invention will be described with particular reference to cells in which the reactant at the negative electrode is sodium and the separator is a sodium $\beta$-alumina material e.g. as described in the Sulphur Institute Journal Vol. 8 1972, No. 4, at page 13. Sodium $\beta$-alumina is a sodium polyaluminate and is used in the glass industry in the form of cast refractory bricks as a furnace liner. This is an excellent conductor of sodium ions at 300° C. The crystal is composed of spinel blocks separated by sodium ion containing planes. The sodium ions are able to diffuse along these planes.

One form of $\beta$-alumina is the $\beta''$-alumina phase which when fabricated into a polycrystalline ceramic has a specific resistivity of approximately 3 ohm-cm at 350° C. The electronic conductivity of $\beta$-alumina is very low and thus there is little tendency to self-discharge of the cell through the separator.

Examples of improved forms of such polycrystalline cation conductive materials are given in British patent specification No. 1202260. British patent specification No. 1297373 gives details of methods by which these materials may be fabricated into tubes.

U.S. Pat. No. 3404035 describes the construction and operation of a rechargeable electric cell having a molten sodium anode and a sulphur electrolyte which is electrochemically reversibly reactive with sodium to form polysulphides and is in contact with the cathode and is separated from the sodium by a cation permeable separator of soda-alumina-silica glass or sodium $\beta$-alumina.

Such cells have an open circuit voltage range of 1.8 to 2.1 volts and a theoretical specific energy of 690 Wh/kg but have to be operated at 350° C or above and on no account must the temperature of the cell be allowed to drop below 230° C on standby. In addition if this cell is overcharged so that all the sulphides are converted to sulphur the molten sulphur electrode becomes non conductive.

Actual specific energies of practical cells however, are in practice rarely in excess of 200 Wh/kg and are usually in the range 100 to 150 Wh/kg.

The need for a high operating temperature leads to sealing problems and the cell has to be provided with extensive insulation, heaters and temperature control apparatus. Moreover the cell is only really useful in essentially continuous use applications since the heat input and the time needed to bring the battery up to operating temperature from cold would lessen the operating economies in intermittent operation.

It would be very desirable therefor to provide a system having high specific energies similar to a sodium sulphur cell as compared with a lead acid cell but able to operate at lower temperature. Also it would be an advantage if the cell had a higher operating voltage range.

We have discovered that these advantages can be obtained to a significant degree by replacing the sulphur reactant at the positive electrode by the iron III/iron II or iron III/iron metal halide redox couple, e.g. utilizing the chlorides.

Thus according to the present invention in an electric accumulator having an alkali metal as the reactant at the negative electrode, and a cationically conductive separator physically separating the reactant at the positive electrode, whilst permitting passage of cations of the alkali metal therethrough, the reactant at the positive electrode comprises a mixture which, in the fully charged state, comprises 5 to 75 mole % of aluminum chloride and 95 to 25 mole % iron III chloride.

The invention also extends to an electrochemical cell in which a negative electrode reactant metal is located in electrical contact with a negative electrode at a negative electrode region, and is separated from a positive electrode region by a ceramic separator, which has a conductivity to cations of the said negative electrode metal at a temperature in the range of 150° C to 350° C which is greater than its' electrical conductivity, the positive electrode region containing positive electrode reactant material comprising at least one metal salt, the positive electrode material having a melting point not greater than 350° C, and preferably in the range 100° C to 250° C or 150° C to 200° C and a boiling point of at least 100° C, the said positive electrode material being in conductive contact with the said separator, a positive current collecting electrode being located in electrical contact with the said positive electrode material, the positive electrode reactant material comprising a mixture which in the fully charged state comprises 5 to 75 mole % of aluminium chloride, 1 to 30% of alkali metal chloride, the alkali metal being the same as the reactant at the negative electrode, the balance of the positive reactant being iron III chloride, the cell being provided with means for maintaining it at an operating temperature at which the negative electrode metal and the positive electrode material are both in the liquid phase.

The positive reactant may contain 25 to 67 mole % of aluminium chloride, and preferably 50 to 33 mole %.

The positive reactant preferably contains 33% to 50% iron III chloride.

In a preferred modification a small proportion of alkali metal chloride e.g. 1 to 30% preferably 10 to 25% be added to the initial fully charged system in place of some of the reactive halide to assist in achieving good conductivity and to raise the boiling point of the mixture relative to its melting point. This will avoid temperature control becoming too critical.

If the negative electrode reactant is lithium or potassium, then lithium chloride or potassium chloride are added instead of sodium chloride.

In a preferred form of the invention the positive reactant contains 50 to 33 mole % aluminium chloride, 33 to 50 mole % iron III chloride and 17 mole % of sodium chloride, the negative reactant being sodium.

The invention also extends to a method of generating electrical energy electrochemically which comprises maintaining in a molten condition a metal negative electrode reactant, e.g. an alkali metal, and a positive electrode reactant which is electrochemically reversibly reactive with cations of said metal negative electrode reactant and is in contact with a positive electrode, the said negative electrode reactant and positive electrode reactant being separated from each other by a separator material which separates the negative electrode reactant and its half cell reactions from the positive electrode reactant and its half cell reactions, the separator material being ionically conductive with respect to cations of said metal negative electrode reactant but essentially non conductive with respect to electrons, anions and other cations when a difference of electrical potential is provided between the negative electrode reactant and the positive electrode, and electrically connecting the metal negative electrode reactant and the positive electrode by a conductor forming part of an electrical circuit, and in which the positive electrode reactant material comprises a mixture which in the fully charged state comprises 5 to 75 mole % of aluminium chloride, 1 to 30% of alkali metal chloride, the alkali metal being the same as the reactant at the negative electrode, the balance of the positive reactant being iron III chloride.

The reactive halide is mixed with aluminium chloride so as to reduce the melting point of the reactive halide. Clearly the minimum amount of aluminium chloride will be used so as to maximise the mass of the reactive constituents.

The nature and proportions of the ingredients in the halide mixture must be such as to ensure that the halide or halide mixture is always in a liquid state at a temperature at which the metal negative electrode reactant is molten, and as indicated below the composition and thus the melting point of the halide mixtures will vary with the state of charge of the cell.

With any system in which, when the cell has been taken to the fully discharged state, the reactive positive electrode materials are reduced to the metallic state and sodium chloride is produced, when the negative reactant is sodium, sufficient aluminium chloride is desirably included in the initial fully charged mixture so as to ensure that the final fully discharged mixture is sufficiently liquid in the operating temperature range e.g. 150° C to 250° C.

The amount of aluminium chloride used is desireably such that the final mixture desireably contains less than 50% sodium chloride.

We thus prefer in any such systems to ensure that the mixtures in the fully charged state are such that at the fully discharged state the sodium chloride concentration of the mixture does not exceed 50 mole %.

It may also be desirable to ensure that even at the partially discharged intermediate valency states the sodium chloride concentration does not exceed 50 mole %.

However we have found that with iron III/iron II, aluminium chloride, sodium chloride systems this condition can be exceeded without adverse effects on the cell.

The cell conveniently has an outer mild steel tubular container acting as the negative electrode. A tubular $\beta$-alumina container is located within the steel tube and the molten alkali metal (e.g. sodium) is located within this outer annular compartment.

A graphite positive electrode is positioned preferably concentrically, within the $\beta$-alumina tube which also contains the metal halides. The graphite or carbon positive electrode preferably has a metal core or mesh support e.g. of copper to enhance its conductivity whilst ensuring that it remains resistant to attack by the fused salt mixture.

The annulus between the outer container and the separator tube preferably contains a conventional iron wick.

The iron wick may be a mesh disposed against the outside face of the separator and having strand thickness and a mesh gap-size such that the molten sodium will wick up the mesh to maintain the surface of the ceramic separator wetted with molten sodium at all states of charge.

Alternatively the system may be provided with a superposed reservoir for the molten sodium which thus feeds down to the annular compartment under gravity as required during discharge and can flow back up into the reservoir during charging of the cell. The annular compartment may be made narrow e.g. 0.1 to 1 mm thick.

A metal mesh could be located in the annulus as a spacer between the ceramic separator and the outer container.

The positive current collector may be made of carbon or graphite e.g. as described in U.S. Pat. No. 3,404,035.

The $\beta$-alumina may be prepared in pure form by the method described in U.S. Pat. No. 3,404,035 e.g. in Example 4.

One form of $\beta$-alumina which can be used has a nominal formula of $Na_2O.11\ Al_2O_3$, and is optically free from a second phase and has a 16% excess of sodium ions over the above formula as determined by total exchange of sodium for silver and gravimetric analysis.

The sodium ion conductivity and resistivety of this material as determined by Whittingham and Huggins (in Journal of Chemical Physics 54, 1971, pages 414–416) varies with temperature as follows: at 350° C the conductivity is 0.25 $ohm^{-1}\ cm^{-1}$ corresponding to a resistivity of 4 ohm. cm; at 300° C the conductivity is 0.175 ohm cm corresponding to a resistivity of 5.7 ohm cm; at 250° C the conductivity is 0.135 $ohm^{-1}\ cm^{-1}$ corresponding to a resistivity of 7.4 ohm cm; at 200° C the conductivity is 0.1 $ohm^{-1}\ cm^{-1}$ corresponding to a resistivity of 10 ohm cm; at 150° C the conductivity is 0.075 $ohm^{-1}cm^{-1}$, corresponding to a resistivity of 13.4 ohm cm; and at 100° C the conductivity is 0.048 $ohm^{-1}\ cm^{-1}$ corresponding to a resistivity of 21 ohm cm.

The reduced cation conductivity of $\beta$-alumina at the lower temperatures of 150° to 250° C can be tolerated due to the increased open circuit voltage of the systems in accordance with the present invention as compared with sodium sulphur systems. If a lithium anode is used, or a potassium anode is used potassium or lithium $\beta$-aluminas would have to be used instead of sodium $\beta$-alumina.

In its broadest aspect the invention provides a cell in which a negative electrode metal is located in electrical contact with a negative electrode at a negative electrode region and is separated from a positive electrode region by a ceramic separator, which has a conductivity to cations of the said negative electrode metal at a temperature in the range 150° C to 350° C which is greater than its' electrical conductivity, the positive electrode region containing positive electrode material comprising at least one metal salt, the positive electrode material having a melting point not greater than 350° C, and preferably in the range 100° C to 250° C or 150° C to 200° C and a boiling point of at least 100° C, the said positive electrode material being in conductive contact with the said separator, a positive current collecting electrode being located in electrical contact with the said positive electrode material, which is further characterized as specified herein, the cell being provided with means for maintaining it at an operating temperature at which the negative electrode metal and the positive electrode material are both in the liquid phase.

The invention also extends to a method of generating electrical energy electrochemically which comprises maintaining in a molten condition a metal negative electrode reactant, e.g. an alkali metal, and a positive electrode reactant which is electrochemically reversibly reactive with cations of said metal negative electrode reactant and is in contact with a positive electrode, the said negative electrode reactant and positive electrode reactant being separated from each other by a separator material which separates the negative electrode reactant and its half cell reactions from the positive electrode reactant and its half cell reactions, the separator material being ionically conductive with respect to cations of said metal negative electrode reactant but essentially non conductive with respect to electrons, anions and other cations when a difference of electrical potential is provided between the negative electrode reactant and the positive electrode, and electrically connecting the metal negative electrode reactant and the positive electrode by a conductor forming part of an electrical circuit, and in which the positive electrode reactant is further characterized as specified herein.

When ferric chloride mpt 304° C bpt, 315° C is used up to 90 mole % of aluminium chloride e.g. 5 to 75% or 20 to 67 or 40 to 60 mole % may be added.

Examples of these mixtures include 50 mole % aluminium chloride and 50 mole % ferric chloride, or 33 mole % aluminium chloride and 67 mole % ferric chloride, or 80 mole % aluminium chloride and 20 mole % ferric chloride which melts below 194° C.

The mixtures as defined above correspond to the fully charged condition; as the cell is discharged the ferric chloride is reduced to ferrous chloride and an equal amount of sodium chloride. Ferrous chloride has a melting point of 630° C, sodium chloride has a melting point of 803° C; the system is converted from a binary one to a quaternary one.

In the ferric/ferrous chloride/sodium cell system the halide mixture in the fully discharged state would be converted into a ternary system. One example is the 50/50 mole % ferric chloride aluminium chloride mixture which in the fully discharged condition is converted into $33^1/3$ / $33^1/3$ / $33^1/3$ mole % ferrous chloride/sodium chloride/aluminium chloride mixture.

The ferric/ferrous chloride/sodium couple has a theoretical specific energy of 530 Wh/kg, an operational temperature range below 250° C and an open circuit voltage of 3.65 volts. The ferric chloride/iron/sodium system which could use a graphite electrode (an iron electrode could not be used since this would react with ferric chloride to produce ferrous chloride) could be used in the pure fully charged state mpt 304° C, e.g. with a conventional β-alumina at 305° C. Alternatively the ferric chloride could be used at a lower temperature, such as in the 200° to 250° C range, again with a conventional sodium β-alumina. In this case the ferric chloride would be mixed with a halide e.g. aluminium tri-chloride to reduce its melting point. The open circuit voltage would be 3.65 volts until the ferric chloride had been converted to ferrous chloride when it would drop to 2.43 volts. During this part of the discharge cycle the iron would be likely to deposit on the graphite or carbon current collector and may be expected to increase its current collecting ability. The theoretical specific energy to full discharge is 970 Wh/kg.

The ferric chloride/iron/sodium cell system in the fully charged state discharges in two stages in which in the first stage all the ferric chloride is reduced to ferrous chloride and in the second stage the ferrous chloride is reduced to iron. The iron is plated out on the graphite electrode and the composition of the ternary system ferrous chloride/aluminium chloride/sodium chloride changes becoming more rich in sodium chloride and less rich in ferrous chloride. When fully discharged the halide system becomes essentially binary. One such binary mixture is $42^6/7$ mole % sodium chloride and $57^1/7$ mole % aluminium chloride which has a melting point of 125° C. When fully charged the composition is 20% ferric chloride 80 mole % aluminium chloride and at the onset of the second reduction stage $16^2/3$ : $16^2/3$ : $66^2/3$ mole % ferrous chloride/sodium chloride/aluminium chloride (both systems melting at temperatures below 194° C).

The invention may be put into practice in various ways and two specific embodiments will be described by way of example with reference to the accompanying drawings, in which:

FIG. 4 is a plot of another charge discharge cycle for Example 2 below under different discharge conditions.

Figure 1:
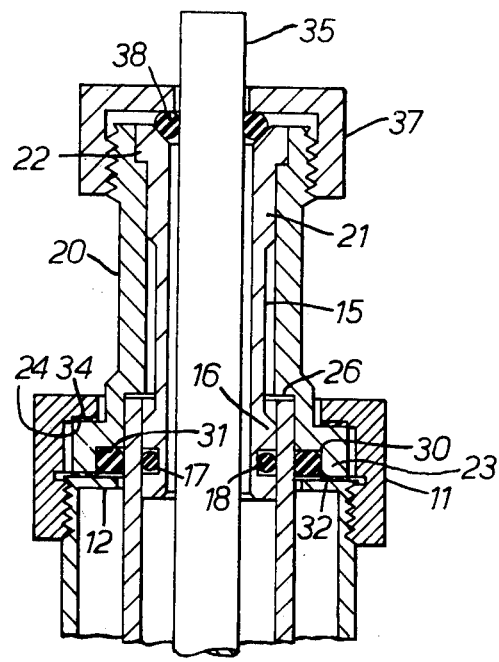
FIG. 1 is longitudinal cross section of a cell in accordance with the invention.
Figure 2:
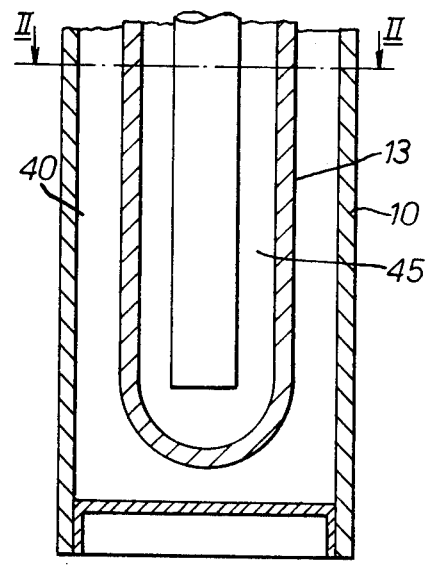
FIG. 2 is a transverse cross section on the line II—II of FIG. 1.
Figure 2:
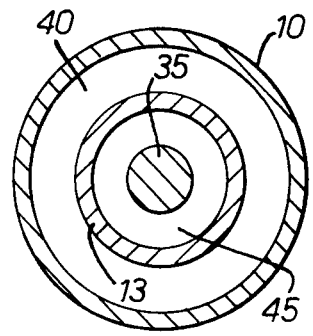

Two examples will be described both examples utilize the same cell which is constructed as follows:

The cell shown in FIGS. 1 and 2 consists of an outer tubular container 10 of stainless steel having a closed bottom and a screw fitted stainless steel cap 11. The top end of the tube 10 has an inwardly extending radial flange 12. A ceramic round bottomed tube 13 is located inside the container 10 and extends up from its bottom end out through the gap left by the flange 12 in the top end of the container 10. The tube 13 is formed of β alumina as described above and functions as a separator and a solid electrolyte.

A substantially cylindrical inner seal piece 15 made of polytetrafluoroethylene (TEFLON) extends down into the open end of the tube 13 and has a thickened lower end portion 16 which bears tightly against the inside face of the tube 13 and has an external annular groove 17 containing a VITON 'O' ring seal 18.

A substantially cylindrical outer seal piece 20 made of stainless steel encloses the inner seal piece 15 and is a close fit around a thickened end portion 21 and shoulder 22 of the inner seal piece 15 at its top end.

The bottom end of the seal piece 20 has an outwardly extending bottom shoulder 23 dimensioned so that its top face 24 is engaged and clamped by the inside face of the top of the outer cap 11 and insulated therefrom by mica insulation 34. The bottom end of the outer seal piece 20 also has an inner annular cylindrical recess 26 in which the top end of the tube 13 is located and adjacent the extreme bottom edge of the piece 20 there is a broader recess 30 in which a VITON 'O' ring 31 is located, which bears against the top of the flange 12 and the outside of the tube 13 as well as the piece 20. Mica insulation 32 is disposed between the top of the flange 12 and the bottom of the piece 20.

A graphite rod 35 extends down inside the tube 13 and is held in position by a top cap 37 screwthreaded on to the outside face of the top of the outer seal piece 20 and a VITON 'O' ring 38 located in a conical inwardly facing sealing 39 formed in the top end 22 of the inner seal piece 15.

In use molten sodium is located in the outer annulus 40 between the container 10 which acts as the negative current collector and the separator/electrolyte tube 13.

The molten salt positive electrode reactant is located on the inner annulus 45 between the tube 13 and the rod 35.

The sodium and the molten salt are sealed from contact with each other and with the atmosphere.

In an alternative arrangement the locations of the sodium and the fused halide are reversed.

EXAMPLE 1

The negative reactant was sodium. The positive reactant in the fully charged condition was a mixture of 33 mole % iron III chloride (5.8 g) 50 mole % $AlCl_3$ (7.2 g) and 17 mole % sodium chloride (1.1 g) and weighed 14.1 grams.

The cell was heated to 250° C and discharged at the 7 hour rate at 100 milliamps and then recharged at the 28 hour rate at 25 milliamps. After 3 such cycles the cell showed a capacity of 0.7 ampere hours, it could deliver up to 1.6 watts, had an open circuit voltage of 3.8 to 3.9 volts and the maximum current obtainable by short circuiting the cell was 2.0 amps. The cell had a Faradic efficiency of 65–72% based on the weight of iron III chloride.

EXAMPLE 2

Here the positive reactant in the fully charged state was a mixture of 50 mole % iron III chloride (11.15 g), 33 mole % $AlCl_3$ (6.10 g) and 17 mole % sodium chloride (1.35 g), and weighed 18.6 grams.

The cell was heated to 250° C and discharged at the 4 hour rate at 312 milliamps and recharged at the 19 hour rate at 67 milliamps.

Figure 3:
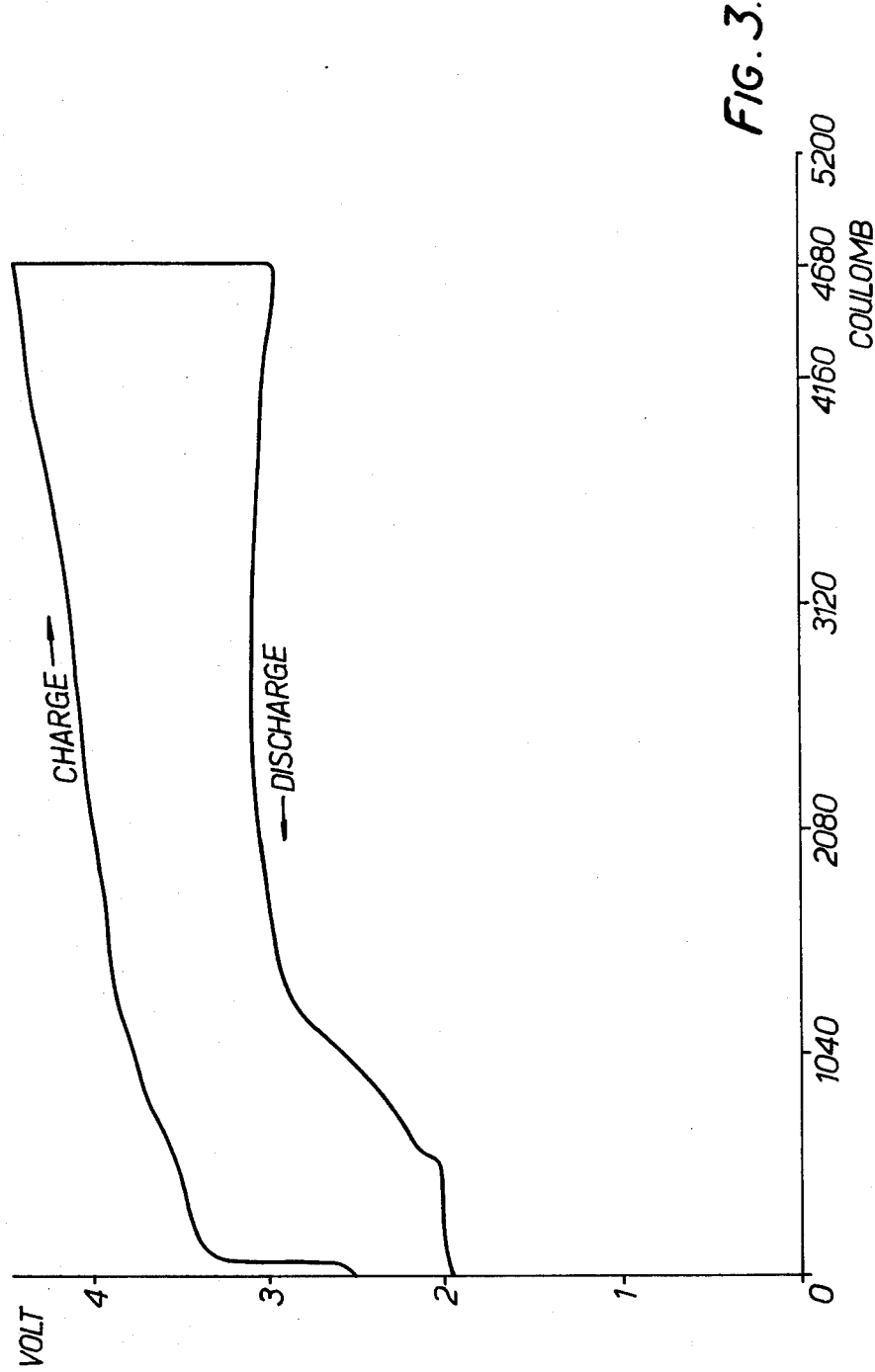
FIG. 3 is a plot of one charge discharge cycle for Example 2 below.

FIG. 3 shows the 6th cycle. The cell had a capacity of 1.3 ampere hours or 1175 joules/gram of iron III chloride. It had the same open circuit voltage, maximum current and Faradic efficiency as Example 1.

As can be seen from FIG. 3 the voltage during discharge remains above 3 volts for well over 50%, namely about 70%, of its total discharge. The ratio of the area under the discharge curve to the area under the charge curve is 71%. In FIG. 4 which is the 7th cycle of this cell, the cell was charged at 104 milliamps for 4.3 hours and then at 52 milliamps for 15.2 hours. It was then discharged at the 7 hour rate at 180 milliamps. It will be observed that the voltage remains above 3 volts for over 75% of the discharge. The ratio of the area under the discharge curve to the area under the charge curve is 78%.

What we claim as our invention and desire the secure by Letters Patent is:

1. An electrochemical cell in which a negative electrode reactant alkali metal is located in electrical contact with a negative electrode at a negative electrode region, and is separated from a positive electrode region by a ceramic separator, which has a conductivity to cations of said negative electrode alkali metal, at a temperature in the range 150° C to 350° C, which is greater than its electrical conductivity, the positive electrode region containing positive electrode reactant material comprising at least one metal salt, the positive electrode material having a melting point not greater than 350° C and a boiling point of at least 100° C, said positive electrode material being in conductive contact with said separator, a positive current collecting electrode being located in electrical contact with said positive electrode material, the positive electrode reactant material comprising a mixture which in the fully charged state comprises 33 to 50 mole % of aluminum chloride, 50 to 33 mole % of iron (III) chloride, the balance of the positive electrode material being alkali metal chloride, the alkali metal being the same as the reactant at the negative electrode, the cell being provided with means for maintaining it at an operating temperature at which the negative electrode metal and the positive electrode material are both in the liquid phase; wherein the voltage during discharge is about 3 volts for more than 50% of its total discharge period and wherein during the last stages of said discharge period the voltage drops rapidly.

2. An accumulator as claimed in claim 1 in which the positive reactant contains 10 to 25 mole % of alkali metal chloride.

3. An accumulator as claimed in claim 1 in which the positive reactant contains 50 to 33 mole % aluminium chloride, 33 to 50 mole % iron III chloride and 17 mole % of sodium chloride, the negative reactant being sodium.

4. A method of generating electrical energy electrochemically which comprises maintaining in a molten condition an alkali metal negative electrode reactant, and a positive electrode reactant which is electrochemically reversibly reactive with cations of said metal negative electrode reactant and is in contact with a positive electrode, said negative electrode reactant and positive electrode reactant being separated from each other by a separator material which separates the negative electrode reactant and its half cell reactions from the positive electrode reactant and its half cell reactions, the separator material being ionically conductive with respect to cations of said metal negative electrode reactant but essentially non conductive with respect to electrons, anions and other cations when a difference of electrical potential is provided between the negative electrode reactant and the positive electrode, and electrically connecting the metal negative electrode reactant and the positive electrode by a conductor forming part of an electrical circuit, and in which the positive electrode reactant material comprises a mixture which in the fully charged state comprises 33 to 50 mole % of aluminium chloride, 50 to 33 mole % of iron (III) chloride, the balance of the positive electrode material being alkali metal chloride, the alkali metal being the same as the reactant at the negative electrode.

* * * * *